UNITED STATES PATENT OFFICE 2,265,165

PROCESS FOR REACTING KETENE WITH A VINYL KETONE

Heinrich Hopff and Wilhelm Rapp, Ludwigshafen-on-the-Rhine, Germany, assignors to I. G. Farbenindustrie Aktiengesellschaft, Frankfort-on-the-Main, Germany No Drawing. Application March 6, 1940, Serial No. 322,546. In Germany March 8, 1939

3 Claims. (Cl. 260—344)

The present invention relates to organic oxygen compounds and a process of producing same.

We have found that organic compounds containing oxygen which are suitable for a variety of applications and may easily be converted into γ-acylbutyric acid substances may be obtained by causing ketene to react with vinyl ketones. Suitable vinyl ketones are those containing besides the vinyl group an alkyl group, for example the methyl group, or a cycloalkyl, aralkyl or aryl group attached to the keto group. By the reaction are apparently formed the lactones of the enolized γ-acylbutyric acids. These lactones may be converted into γ-acylbutyric acid substances by means of compounds containing at least one reactive hydrogen atom, especially water, alcohols, ammonia and primary or secondary amines. By a simple treatment with water or, if desired, with aqueous alkalies or acids, the lactones are converted into γ-acylbutyric acids; by treating them with amide-forming agents, for example ammonia or primary or secondary amines, the corresponding amides are formed, while alcohols yield esters of the γ-acylbutyric acids.

The reaction proceeds according to the following scheme:

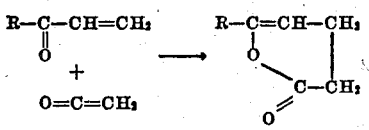

wherein R denotes the alkyl, cycloalkyl, aralkyl or aryl group. By treating the compounds thus obtained with water, acids of the formula R—CO—CH$_2$—CH$_2$—CH$_2$—COOH are formed.

For the reaction of the ketene with the vinyl ketones it is usually advantageous to work in the absence of water, if desired, in the presence of inert solvents. Usually heating at a moderate temperature, say from 60 to 80° C., is advisable.

When γ-acylbutyric acids are to be prepared, it is advantageous to remove any unconverted ketone after its reaction with the ketene and to treat the reaction product formed with water. When the ketene is reacted with the vinyl ketone in the presence of water, γ-acylbutyric acids are directly formed. The acids so obtained may be purified in any appropriate manner, for example by distillation.

The following example serves to illustrate how the present invention may be carried out in practice but the invention is not restricted to this example.

Example

Into a container filled to about half its content with vinyl-methyl ketone and provided with a reflux condenser ketene is introduced at about 70 to 75° C., while stirring, until the absorption subsides, whereupon the excess vinylmethyl ketone is distilled off.

The residue is distilled in vacuo after some water has been added. γ-Acetylbutyric acid is thus obtained; it yields a crystallized semicarbazone in the form of leaflets which when recrystallized from methanol melts at between 165 to 170° C.

What we claim is:

1. The process for the production of organic compounds containing oxygen which comprises causing ketene to react with a vinyl ketone.

2. The process for the production of organic compounds containing oxygen which comprises causing ketene to react with an alkyl vinyl ketone.

3. The process for the production of organic compounds containing oxygen which comprises causing ketene to react with methyl vinyl ketone.

HEINRICH HOPFF.
WILHELM RAPP.